United States Patent
Mehta et al.

[11] Patent Number: 5,944,881
[45] Date of Patent: Aug. 31, 1999

[54] TRI-COMPONENT SECURITY NUMBERING INK

[75] Inventors: Rajendra Mehta, Centerville; Gary Walter Doll, Englewood; Richard Lynn Shields, Centerville, all of Ohio

[73] Assignee: The Standard Register Company, Dayton, Ohio

[21] Appl. No.: 08/900,732

[22] Filed: Jul. 25, 1997

[51] Int. Cl.$^6$ .................................................. C09D 11/00
[52] U.S. Cl. .................................. 106/31.28; 106/31.32; 106/31.15
[58] Field of Search .............................. 106/31.32, 31.28, 106/31.15

[56] References Cited

U.S. PATENT DOCUMENTS

| | | | |
|---|---|---|---|
| 2,441,559 | 5/1948 | Burrell et al. | 106/31.15 |
| 2,681,317 | 6/1954 | Grossman | 106/31.15 |
| 3,614,430 | 10/1971 | Berler | 250/271 |
| 3,886,083 | 5/1975 | Laxer | 252/301.16 |
| 4,066,280 | 1/1978 | LaCapria | 283/91 |
| 4,079,026 | 3/1978 | Mone | 524/513 |
| 4,533,930 | 8/1985 | Shioi et al. | 503/211 |
| 4,884,828 | 12/1989 | Burnham et al. | 283/89 |
| 5,135,569 | 8/1992 | Mathias | 106/31.15 |
| 5,145,518 | 9/1992 | Winnik et al. | 106/31.15 |
| 5,256,192 | 10/1993 | Liu et al. | 106/31.15 |
| 5,271,645 | 12/1993 | Wicker | 283/92 |
| 5,290,348 | 3/1994 | Auslander | 106/31.15 |
| 5,516,362 | 5/1996 | Gundjian et al. | 106/31.15 |
| 5,516,590 | 5/1996 | Olmstead et al. | 428/484 |
| 5,521,722 | 5/1996 | Colvill et al. | 358/500 |
| 5,554,842 | 9/1996 | Connell et al. | 106/31.32 |
| 5,681,381 | 10/1997 | Aulander et al. | 106/31.15 |
| 5,783,108 | 12/1998 | MacKay | 106/31.32 |

FOREIGN PATENT DOCUMENTS

| | | |
|---|---|---|
| 2802717 | 7/1979 | Germany . |
| 54-13799 | 2/1979 | Japan . |
| 417488 | 11/1933 | United Kingdom . |

*Primary Examiner*—Mark L. Bell
*Assistant Examiner*—Veronica Faison
*Attorney, Agent, or Firm*—Killworth, Gottman, Hagan & Schaeff, LLP

[57] ABSTRACT

A security ink is provided containing a colored dye, a colored pigment, and a fluorescent pigment. The ink may be printed on a number of security documents such as checks and may be passed through printing devices such as laser printers without the problem of damage to the ink the printed image, or the printer. The fluorescent pigment in the ink will fluoresce when the document is exposed to ultraviolet light and may be used to provide an authentication feature.

15 Claims, 2 Drawing Sheets

TRI-COMPONENT SECURITY NUMBERING INK

BACKGROUND OF THE INVENTION

The present invention relates to a security ink for use in a letterpress printing process, and more particularly, to a security ink including a fluorescent pigment therein which may be activated under ultraviolet light to authenticate security documents such as checks, birth records, auto titles, and the like.

Inks for use in letterpress printing processes are well known in the art. Such inks generally comprise a colored pigment and a colored dye which are typically printed as series of numbers or account numbers on security documents such as checks. When such inks are printed on a substrate by letterpress techniques, the colored pigment stays on the surface of the substrate, while the colored dye at least partially penetrates the surface to form a visible image on the reverse side of the substrate. Such a "dual-component" ink provides a security feature in that one cannot easily alter the images on the substrate because of the penetration of the colored dye into the reverse side of the substrate.

Security documents which utilize such dual-component inks to provide numbering are also generally printed with variable or nonvariable information such as names, amounts, etc. which are typically added by mechanical impact printing devices. However, with the advance of microcomputer technology, a number of faster printing methods have been developed to take advantage of the high-speed printing output which is now possible. Laser printers are an example of non-impact printers which are faster, quieter, and more reliable than impact printers. However, it has been found that dual-component letterpress inks are unsatisfactory for use with laser printers as the inks are not heat resistant and cannot be passed through a laser printer without causing damage to the images formed by the inks.

In recent years, it has also become an increasing concern to be able to provide additional security or authentication features to such inks. For example, many security inks in use today have incorporated fluorescent compounds therein which may be activated under ultraviolet light so as to provide an authentication feature or to provide evidence of attempted tampering. However, such fluorescent compounds have not been successfully used in conjunction with letterpress numbering inks as such fluorescent pigments tend to be masked by the other pigments in the ink.

Accordingly, there is still a need in the art for an ink for use on security documents which may be passed through a laser printer without damage and which includes one or more security and/or authentication features.

SUMMARY OF THE INVENTION

The present invention meets that need by providing a security ink for use on security documents such as checks, birth certificates, etc. The ink may be printed on documents using letterpress printing processes, and is heat resistant so that the documents may be successfully passed through, for example, the heated fuser rolls of a laser printer. The ink includes both colored dyes and pigments which provide visible images on both surfaces of a substrate as well as one or more fluorescent pigments which provide a hidden security feature which can be used to authenticate the document by exposure to ultraviolet light.

According to one aspect of the present invention, a security ink is provided comprising a colored pigment, a fluorescent pigment, a colored dye, and a liquid carrier for the pigments and dye, where the liquid carrier acts as a solvent for the dye. In a preferred embodiment of the invention, the colored pigment is a black pigment. Preferably, the weight ratio of colored dye/liquid carrier to fluorescent pigment to black pigment is from about 30:44:1 to 55:69:10.

Preferably, the fluorescent pigment is selected from the group consisting of red, pink, green, yellow, orange, magenta, and mixtures thereof.

The liquid carrier for the pigments and dye preferably comprises a blend of an aliphatic long chain oil and a long chain unsaturated fatty acid. Preferred aliphatic oils include soybean oil, magie oil, and peanut oil. Preferred fatty acids include linoleic, oleic, myristic, palmitic, linolenic, and linseed.

Preferably, the ink further includes a thickener such as a phenolic resin, a hydrocarbon wax, or fumed silica.

In its preferred form, the security ink comprises from about 1 to about 10% of a colored pigment, from about 1 to about 45% of a fluorescent pigment, from about 3 to about 8% of a colored dye, from about 5 to about 40% of an aliphatic long chain oil, from about 30 to about 40% of an unsaturated fatty acid, and from about 4 to about 10% of a thickener, all percentages by weight.

In another embodiment of the invention, a security document is provided comprising a substrate having first and second major surfaces in which the security ink described above has been applied to the substrate. The security ink comprises a colored pigment, a fluorescent pigment, and a colored dye, where the colored pigment is visible on the first surface of substrate, the colored dye is visible on the second surface of the substrate, and the fluorescent pigment is visible on the first surface of the substrate when viewed under ultraviolet light.

The ink is preferably printed on the substrate by a letterpress printing process. The ink may be printed in the form of numbers, letters, symbols, or other indicia. When the documents are subsequently processed, the documents may be authenticated by viewing the colored dye which is visible on the second surface and by passing the documents under an ultraviolet light so that the fluorescent pigments are visible on the first surface.

The security documents of the present invention are also resistant to heat when passed through printing devices such as laser printers in which the ink is subjected to the heat from the fuser rolls for the toner. By resistant to heat, it is meant that the ink on the document will not smear or offset onto any part of the printer (such as, for example, onto the fuser rolls of a laser printer) when exposed to temperatures of about 450° F. to 475° F. (232.22° C. to 246.11° C.) for a period of about 0.5 seconds or less, which typically occurs when a document is passed through a laser printer.

Accordingly, it is a feature of the present invention to provide a security ink which may be printed on a security document which includes a fluorescent pigment therein which is visible under ultraviolet light to provide authentication of the document. It is a further feature of the invention to provide a security ink which is heat resistant when passed through a heated printing device. These, and other features and advantages of the present invention will become apparent from the following detailed description, the accompanying drawings, and the appended claims.

DETAILED DESCRIPTION OF THE PREFERRED EMBODIMENTS

Figure 1:
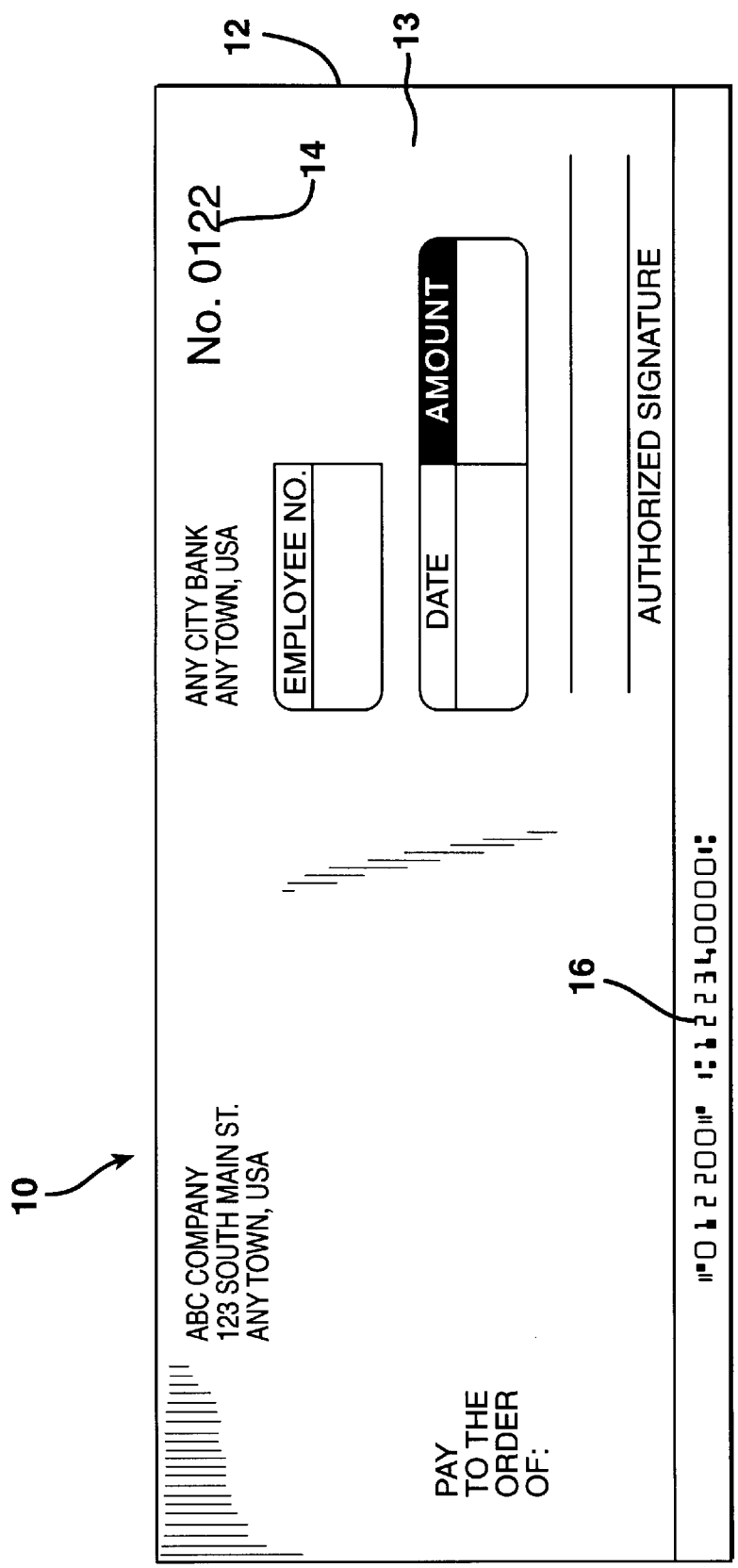
FIG. 1 is a front elevation view of a security document containing the security ink of the present invention which has been printed in the form of numbers.

The present invention provides a unique combination of features for security documents, especially those documents which will be printed using high-speed noncontact printers such as laser printers. The use of a fluorescent pigment in combination with the colored pigments or dyes of the ink provides an additional security feature as the fluorescent pigment may be activated under ultraviolet light to verify the authenticity of the document. In addition, the ink is heat resistant, so documents printed with the ink may be subsequently passed through printing devices such as laser printers without damage to the ink, the printer, or the images formed thereby.

The colored pigment used in the ink of the present invention is preferably a black pigment in an ink base. Such as black-pigmented ink base is available from Continental Ink Company under the designations Forms 3800 Ink or "Laser Safe Base Ink", meaning that the ink is heat resistant and can be passed safely through a laser printer. This is because the ink base also contains a cobalt- or magnesium-based oxidizing agent which functions as a catalyst in the ink composition. The fatty acid component of the security ink crosslinks in the presence of the catalyst, increasing the softening point of the ink, and rendering it heat resistant when it is passed through a laser printer. The colored pigment component of the ink preferably comprises from about 1 to about 10% by weight of the ink.

The colored dye is preferably a red dye base such as Neptum Red Base 486 available from BASF Corporation. The colored dye component of the ink preferably comprises from about 3 to about 8% by weight of the ink.

A number of fluorescent pigments are suitable for use in the present invention. Preferred colors for use include Rocket Red (SFB-13), Aurora Pink (SFB-11B and SFB-114), Fire Orange (SFB-14), Blaze Orange (SFB-15), Arc Yellow (SFB-16), Signal Green (SFI-18), Corona Magenta (SFB-21), and Strong Corona Magnetic (SFB-22), all available from Day-Glo Corporation. These pigments may be used separately or mixed together. For example, green and red fluorescent pigments may be mixed together to form a single color when activated under UV light. The fluorescent pigment(s) preferably comprise from about 1% to 45% by weight of the ink.

The liquid carrier for the ink preferably comprises a blend of long chain fatty acids and oils. By "long chain" it is meant that the carbon backbone is at least 10 carbon atoms. Preferred long chain oils include such aliphatic oils as soybean oil, magie oil, peanut oil, and linseed oil. Soybean oil is most preferred. The long chain oil component preferably makes up from about 5 to about 40% by weight of the ink.

The fatty acid component of the liquid carrier preferably comprises long chain unsaturated fatty acids such as linoleic, oleic, myristic, palmitic, and linolenic acids, with linoleic acid being the most preferred. The fatty acid component preferably makes up from about 30 to about 40% by weight of the ink.

The ink also preferably includes from about 4 to 10% by weight of a thickener. Suitable thickeners include phenolic resins. A preferred phenolic resin is available from Schenectady Chemicals under the designation HRJ 2053 and has a melting point of 232° F.

Preferably, the ink is printed onto a security document by a letterpress printing process. The resulting security document will provide authentication not only by the colored dye component showing through the opposite surface of the document but also by the use of ultraviolet light.

With reference to the drawings, it must be appreciated that Patent Office requirements for solid black line drawings on a white surface make illustration of some of the subtleties of our invention relating to different colors difficult by the required Patent Office drawings alone. Reference to the following detailed description of the illustrations will make full appreciation of the drawings and our invention possible.

Referring now to FIG. 1, a security document 10 is illustrated in the form of a check comprising a substrate 12 having a first surface 13 which has been printed with the security ink of the present invention. The ink has been printed as a series number 14 and as an account number 16.

Figure 2:
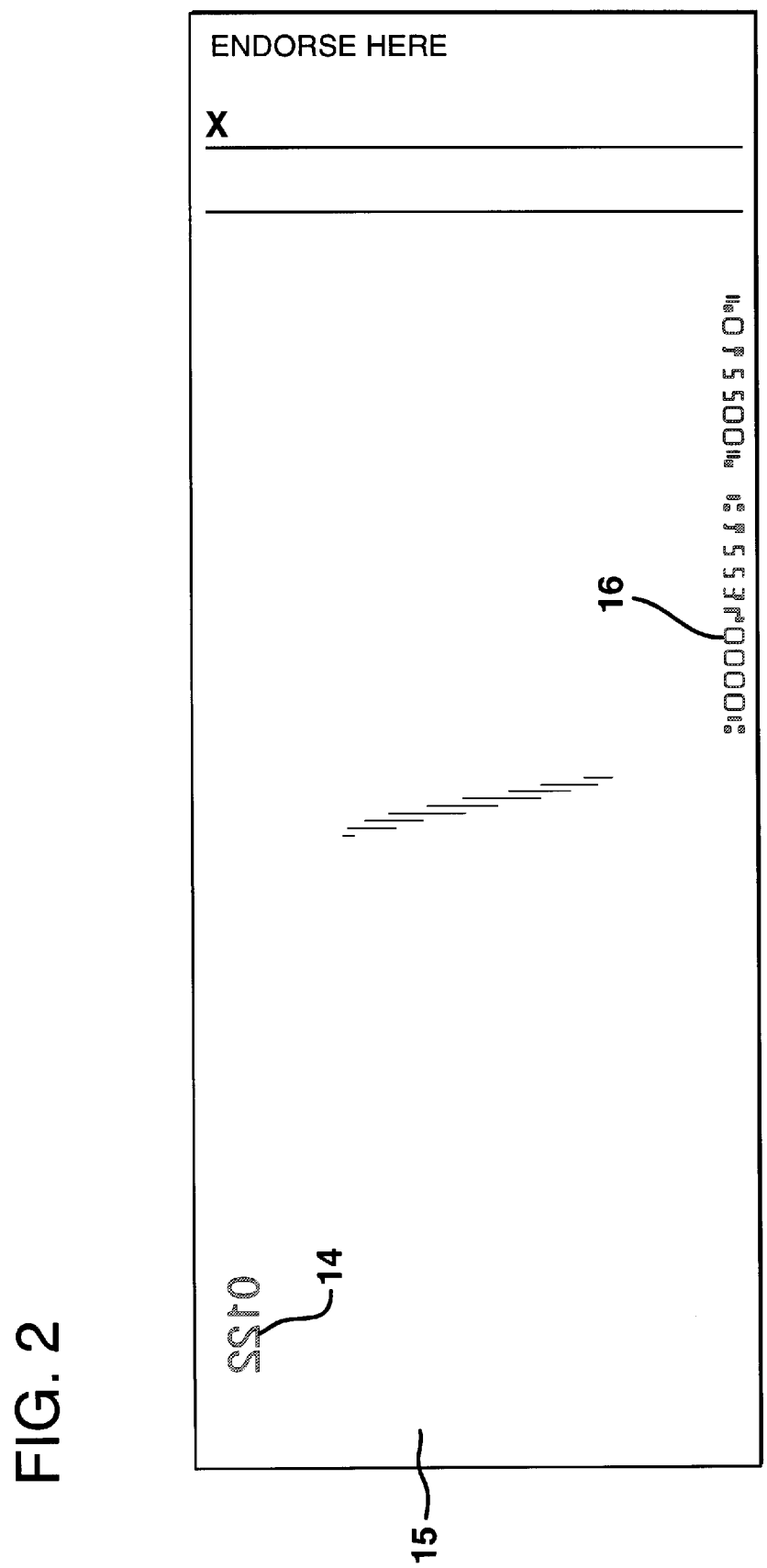
FIG. 2 is a back elevation view of the security document of claim 1 illustrating the penetration of the colored dye into the document.

FIG. 2 illustrates the second surface 15 of the security document and demonstrates how the colored dye component of ink penetrates the surface of the document. The security ink of the present invention functions based on the chromatographic effect of the different components in the ink, i.e., the selective absorption of the components in the ink into the paper causes the pigment and dye to separate. The colored dye travels through the first surface 13 of the substrate, causing a mirror image to form on the second surface 15 of the substrate as shown in FIG. 2, while the colored pigment remains on the first surface of the substrate. While not absolutely necessary, it is preferred that the pigment and dye components of the ink be of different colors.

For example, where the colored pigment is black and the colored dye is red, the black and fluorescent pigments remain on the surface while the red dye is absorbed into the paper to form an image on the second surface in red. The fluorescent pigment on the surface of the substrate is virtually invisible when viewed under normal ambient light, but becomes visible when viewed under ultraviolet light.

In order that the invention may be more readily understood, reference is made to the following examples, which are intended to be illustrative of the invention, but are not intended to be limiting in scope.

EXAMPLE 1

A tricomponent security ink was prepared by combining the following materials:

|  | Weight % |
|---|---|
| Long chain fatty acid[1] | 36 |
| Colored dye base[2] | 4.6 |
| Fluorescent base (red)[3] | 45 |
| Long chain oil[4] | 9.0 |
| Black pigment base[5] | 1.1 |
| thickener[6] | 4.3 |

[1]Linoleic acid (Emersol 3125) from Hankel Corporation
[2]Neptum red base 486 from BASF
[3]SFB-13 from Day-Glo, supplied as a paste containing 11.77% by weight non-volatile oil as a liquid carrier
[4]Technical grade soybean oil from Cargill Corporation
[5]Forms 3800 ink from Continental Ink Company, supplied as a paste containing 31.0% by weight non-volatile oil as a liquid carrier
[6]HRJ 2053 phenolic resin from Schenectady Chemicals The red base dye was dissolved into the linoleic acid by mixing for thirty minutes at 100° C. The fluorescent base, soybean oil, and black base were then added to the mixture.

The temperature was then raised to 120° C., and the thickener was added. The components were mixed for forty minutes at 120° C. and then drained into containers. The containers of ink were then placed in a freezer for 1 to 1 ½ hours, and then stored in a refrigerator until the ink was applied to a substrate using a letterpress numbering unit. Forms printed using this ink have been successfully passed through a laser printer with no adverse affects on the ink. When subjected to black light, forms printed using this ink were visually observed to fluoresce.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A security ink comprising a colored pigment, a fluorescent pigment, a colored dye, and a liquid carrier for said pigments and dye, said liquid carrier acting as a solvent for said dye, wherein said colored dye will be absorbed by a paper substrate.

2. A security ink as claimed in claim 1 in which said colored pigment is black.

3. A security ink as claimed in claim 1 in which said fluorescent pigment is selected from the group consisting of red, pink, green, yellow, orange, magenta, and mixtures thereof.

4. A security ink as claimed in claim 1 in which the weight ratio of the colored dye and liquid carrier, fluorescent pigment, and colored pigment is from about 30:44:1 to 55:69:10.

5. A security ink as claimed in claim 1 in which said liquid carrier comprises a blend of an aliphatic long chain oil selected from the group consisting of soybean oil, magie oil, linseed oil, and peanut oil, and an unsaturated fatty acid selected from the group consisting of linoleic, oleic, myristic, palmitic, and linolenic acids.

6. A security ink as claimed in claim 5 further including a thickener.

7. A security ink as claimed in claim 6 in which said thickener comprises a phenolic resin.

8. A security ink comprising from about 1 to about 10% of a colored pigment, from about 1 to about 45% of a fluorescent pigment, from about 3 to about 8% of a dye, from about 5 to about 40% of an aliphatic long chain oil, from about 30 to about 40% of an unsaturated fatty acid, and from about 4 to about 10% of a thickener, all percentages by weight.

9. A security document comprising a substrate having first and second major surfaces; said substrate having a security ink applied to said first major surface; said security ink comprising a colored pigment, a fluorescent pigment, and a colored dye; said colored pigment being visible on said first surface of said substrate; said dye penetrating said first surface of said substrate and being visible on said second surface of said substrate; and said fluorescent pigment being visible on said first surface of said substrate when viewed under ultraviolet light.

10. A security ink comprising a black pigment, a fluorescent pigment, a red dye, and a liquid carrier for said pigments and dye, said liquid carrier acting as a solvent for said dye.

11. A security ink as claimed in claim 1 wherein said colored pigment further includes a catalyst which crosslinks said liquid carrier.

12. A security ink as claimed in claim 1 wherein said liquid carrier comprises an unsaturated fatty acid.

13. A security ink as claimed in claim 9 wherein said colored pigment further includes a catalyst which crosslinks said liquid carrier.

14. A security ink as claimed in claim 9 wherein said liquid carrier comprises an unsaturated fatty acid.

15. A security ink comprising a colored pigment, a fluorescent pigment, a colored dye, and a liquid carrier for said pigments and dye; said ink being heat resistant when passed through a laser printer.

* * * * *